United States Patent
Mukherjee et al.

(10) Patent No.: US 12,367,264 B2
(45) Date of Patent: Jul. 22, 2025

(54) MULTI-COMPUTER SYSTEM FOR PROVIDING CONTINUOUS AUTHENTICATION AND SECURE ACCESS CONTROL

(71) Applicant: Bank of America Corporation, Charlotte, NC (US)

(72) Inventors: Maharaj Mukherjee, Poughkeepsie, NY (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 18/329,051

(22) Filed: Jun. 5, 2023

(65) Prior Publication Data

US 2024/0406181 A1    Dec. 5, 2024

(51) Int. Cl.
| | |
|---|---|
| G06F 18/2413 | (2023.01) |
| G06N 20/00 | (2019.01) |
| G06Q 20/40 | (2012.01) |
| H04L 9/40 | (2022.01) |
| H04L 41/16 | (2022.01) |

(52) U.S. Cl.
CPC ....... G06F 18/24133 (2023.01); G06N 20/00 (2019.01); G06Q 20/4016 (2013.01); H04L 41/16 (2013.01); H04L 63/102 (2013.01)

(58) Field of Classification Search
CPC .. G06F 18/24133; G06F 18/23; G06F 18/214; G06F 21/316; G06F 16/285; G06Q 20/4016; G06Q 20/409; G06Q 20/4014; G06Q 20/386; G06N 7/01; G06N 20/20; G06N 20/00; H04L 67/535; H04L 63/104; H04L 63/1425; H04L 63/107; H04L 63/1416; H04L 63/0876; H04L 63/20; H04L 63/0236; H04L 63/1433; H04L 63/08; H04L 63/102; H04W 12/06; H04W 12/68

See application file for complete search history.

(56) References Cited

U.S. PATENT DOCUMENTS

| | | |
|---|---|---|
| 8,660,322 B2 | 2/2014 | Tsai et al. |
| 10,063,374 B2 | 8/2018 | Barnasag et al. |
| 10,091,184 B2 | 10/2018 | Smith et al. |
| 10,304,267 B2 | 5/2019 | Ashenfelter et al. |
| 10,606,988 B2 | 3/2020 | Sambamurthy et al. |
| 10,803,436 B2 | 10/2020 | Kobres et al. |

(Continued)

*Primary Examiner* — Kyung H Shin
(74) *Attorney, Agent, or Firm* — Banner & Witcoff, Ltd.

(57) ABSTRACT

Arrangements for continuous authentication and secure access control are provided. In some aspects, a computing platform may receive user data from a plurality of user data sources. The user data may include a plurality of different data types. The computing platform may use the user data to train a machine learning model, which may then be used to generate user specific baseline data. Subsequent user data may be received and analyzed, using the machine learning model, to determine whether an anomaly exists between the subsequent user data and the baseline data. If not, the user may be considered authenticated and second user data may be received and analyzed to continuously authenticate the user. If an anomaly is detected, the anomalous data and other data may be further analyzed to determine whether to authenticate the user or execute a response action.

20 Claims, 11 Drawing Sheets

(56) References Cited

U.S. PATENT DOCUMENTS

| | | | |
|---|---|---|---|
| 10,951,606 B1 | 3/2021 | Shahidzadeh et al. | |
| 11,087,572 B2 | 8/2021 | Einberg et al. | |
| 11,184,766 B1 | 11/2021 | Lord et al. | |
| 2022/0114593 A1* | 4/2022 | Johnson | G06F 18/24133 |
| 2022/0114594 A1* | 4/2022 | Nunes | G06Q 20/4016 |
| 2022/0377087 A1* | 11/2022 | Singh | G06N 20/00 |
| 2023/0206233 A1* | 6/2023 | Aument | G06Q 20/4016 705/44 |

* cited by examiner

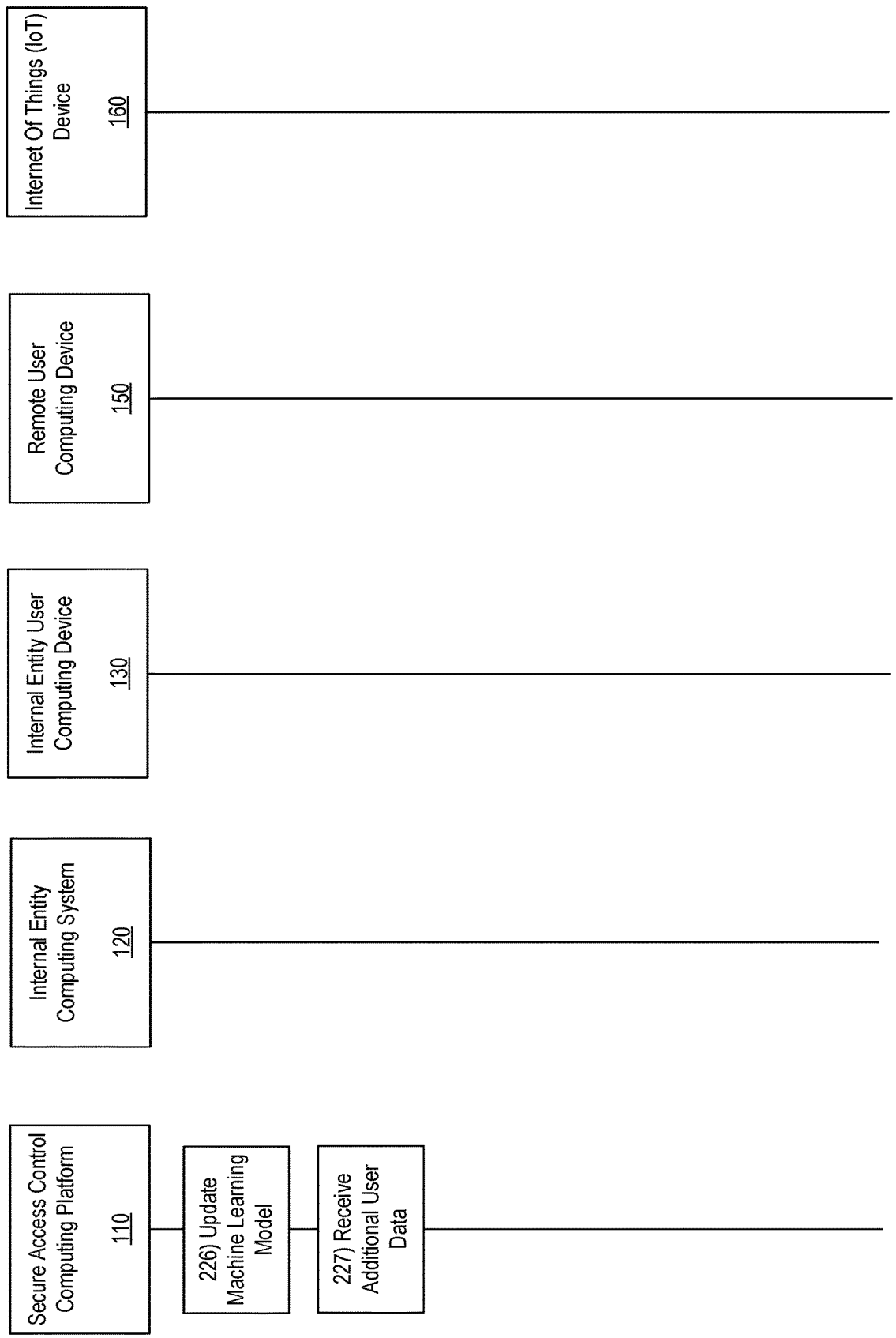

MULTI-COMPUTER SYSTEM FOR PROVIDING CONTINUOUS AUTHENTICATION AND SECURE ACCESS CONTROL

BACKGROUND

Aspects of the disclosure relate to electrical computers, systems, and devices for providing continuous authentication and secure access control.

As unauthorized actors become more sophisticated, protecting access to secure data, devices, physical locations, and the like, becomes even more critical. While passwords, multi-factor authentication, and the like, are often used to secure data, these authentication factors may be compromised, which can lead to unauthorized access to data, secure locations, and the like. Accordingly, aspects described herein provide for continuous, holistic authentication of users based on data captured by a plurality of devices and systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing secure access to data.

In some aspects, a computing platform may receive user data from a plurality of user data sources. The user data may include a plurality of different data types. The computing platform may use the user data to train a machine learning model, which may then be used to generate user specific baseline data.

In some examples, first user data may be received that may include a plurality of data types from the plurality of data sources. The data may be analyzed, using the machine learning model, to determine whether an anomaly exists between the first user data and the baseline data. If not, the user may be considered authenticated and second user data may be received and analyzed to continuously authenticate the user, provide access to secure data, or the like. If an anomaly is detected, in some examples, a confidence factor associated with the anomalous data and/or data source may be compared to a confidence factor for remaining data types and data sources. If the confidence factor of the anomalous data is lower, the user may be authenticated. If the confidence factor of the anomalous data is higher, a response action may be identified and sent to one or more computing devices for execution. The machine learning model may then be updated or refined based on the anomalous data and response action.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing continuous authentication and secure access control in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, as unauthorized actors become more sophisticated, authentication systems must also become more sophisticated. Relying on a single set of credentials or other static authentication data might not be sufficient to control access to secure data, areas, or the like. Accordingly, aspects described herein are directed to a holistic, continuous authentication system that relies on data captured by multiple devices and systems, and uses machine learning, to analyze data and detect anomalies.

For instance, as users interact with various computing devices and systems, Internet of Things (IoT) devices, and the like (e.g., at work, home, and the like), data associated with the user may be captured (e.g., with the permission of the user) and analyzed, using machine learning, to establish baseline user data. In some examples, the several baseline data profiles may be generated based on type of data, data source, time of day, day of week, season, or the like. Accordingly, data may be analyzed against the baseline data on a granular level to authenticate a user.

After generating the baseline data profiles, subsequent user data may be captured (e.g., as the user interacts with devices at work, home, or the like) and machine learning may be used to analyze the subsequent data, as compared to the baseline data, to detect any anomalies in the data. If anomalies are detected, one or more response actions may be identified and executed.

Accordingly, the arrangements described herein may enable users to be authenticated to multiple devices, systems, applications, be provided access to one or more areas or physical locations, or the like, by way of the single, continuous authentication system described herein. In some examples, data may be captured passively (e.g., without user interaction or additional user interaction beyond a user's normal course of business) and used to seamlessly authenticate the user on a continuous basis.

These and various other arrangements will be discussed more fully below.

Figure 1A:
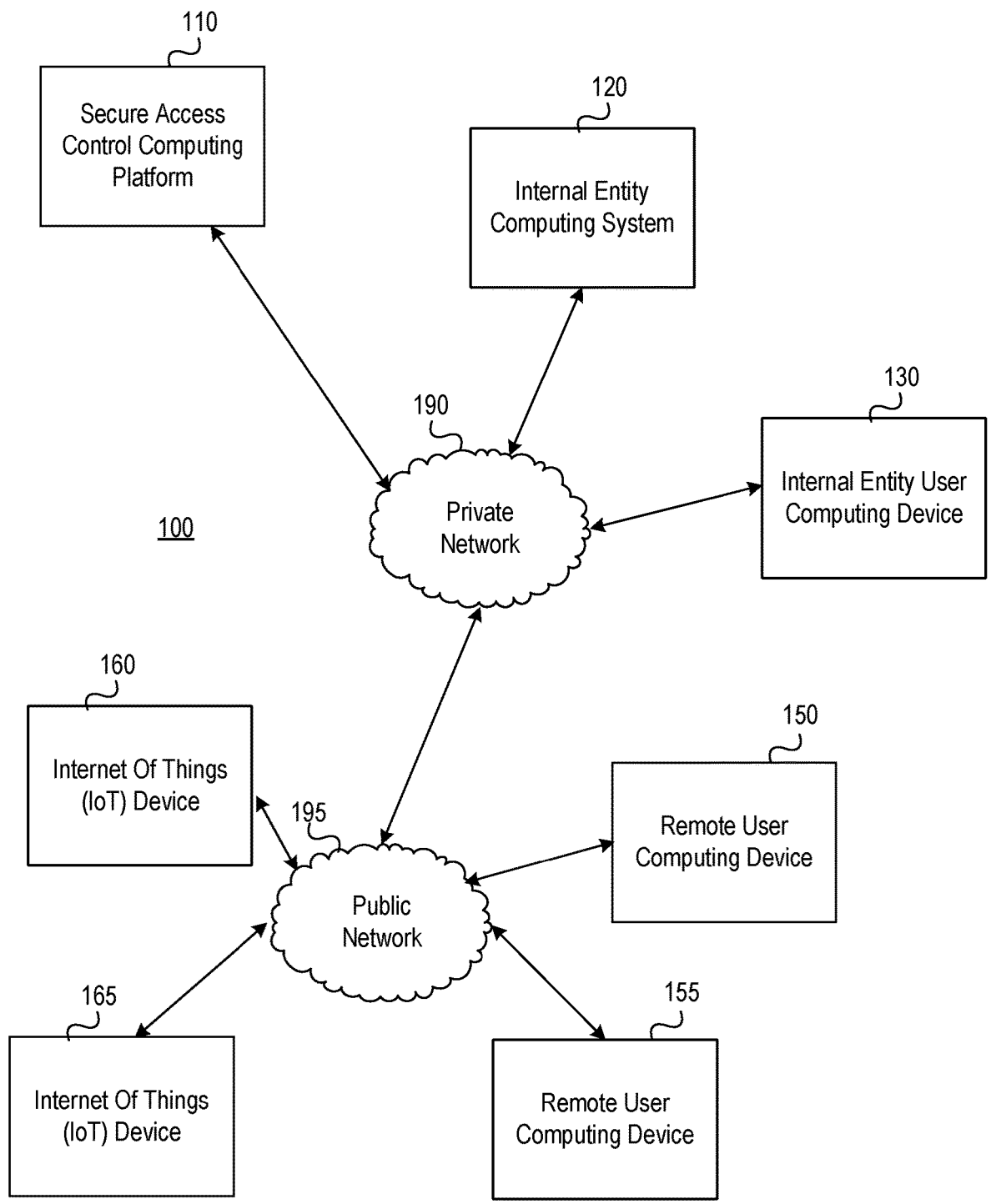
FIGS. 1A-1B depict an illustrative computing environment for implementing continuous authentication and secure access control in accordance with one or more aspects described herein.
Figure 1B:
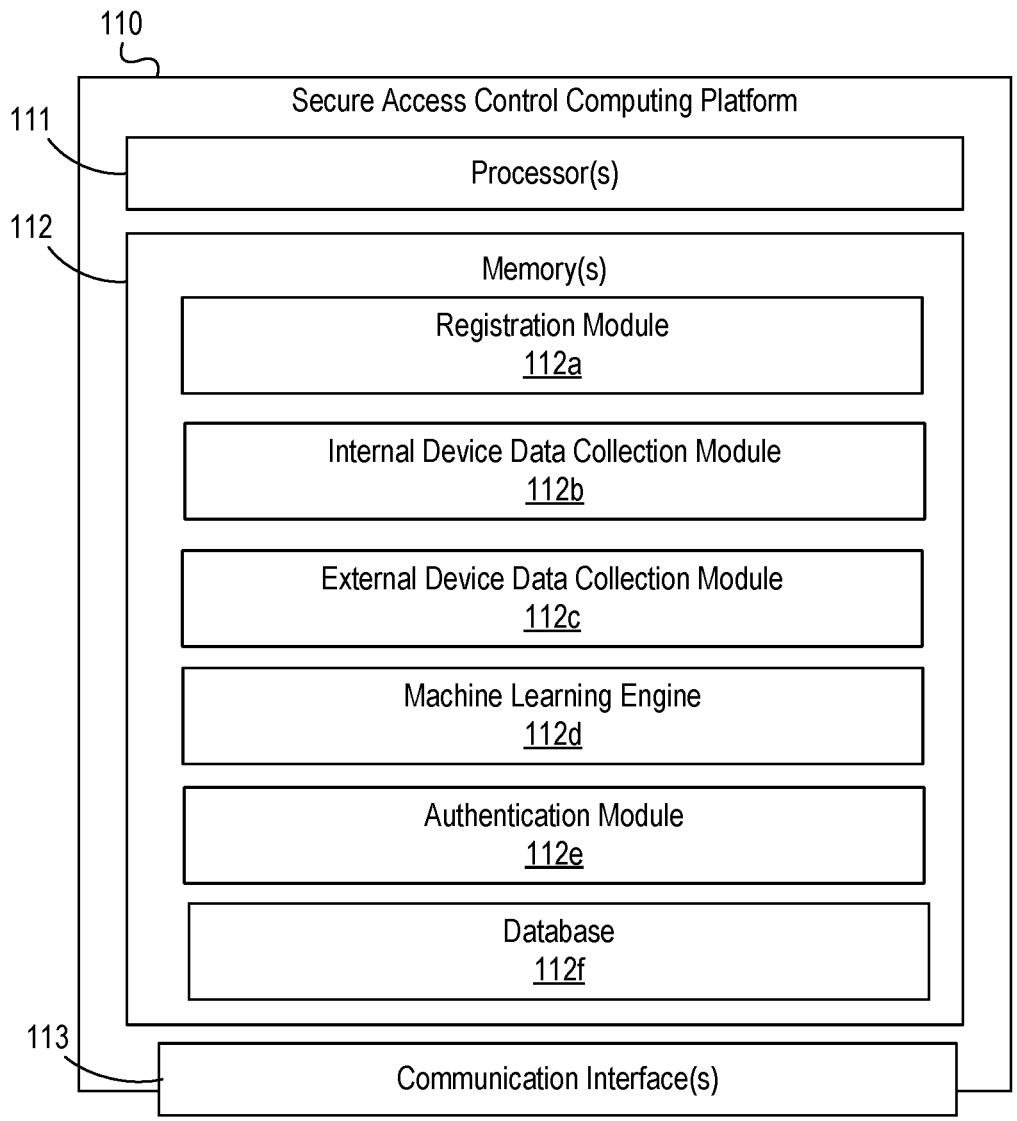

Aspects described herein may be implemented using one or more computing devices operating in a computing environment. For instance, FIGS. 1A-1B depict an illustrative computing environment for implementing continuous authentication and secure access control in accordance with one or more aspects described herein. Referring to FIG. 1A, computing environment 100 may include one or more computing devices and/or other computing systems. For example, computing environment 100 may include secure access control computing platform 110, internal entity computing system 120, internal entity user computing device 130, remote user computing device 150, remote user computing device 155, Internet of Things (IoT) device 160, and IoT device 165. Although one internal entity computing system 120, one internal entity user computing device 130, two remote user computing devices 150, 155, and two IoT devices 160, 165 are shown, any number of devices or systems may be used without departing from the invention.

Secure access control computing platform 110 may be or include one or more computing devices (e.g., servers, server blades, or the like) and/or one or more computing components (e.g., memory, processor, and the like) and may be configured to provide dynamic, efficient and continuous authentication and secure access control. In some examples, secure access control computing platform 110 may receive registration data from one or more users. The registration data may include user identifiers, device identifiers associated with the devices associated with the user, location identifiers, and the like. In some examples, the secure access control computing platform 110 may register a user and generate a user profile for the user. The user profile may include device data associated with the user.

In some arrangements, the secure access control computing platform 110 may receive data from a plurality of user devices. For instance, the secure access control computing platform 110 may be associated with an enterprise organization at which a user is employed. Accordingly, secure access control computing platform 110 may receive data from an enterprise computing device associated with the user, such as internal entity user computing device 130. The data may include login credentials, typing patterns (e.g., speed, accuracy, pressure on keys, or the like), mouse movement data, speech pattern data, biometric data, or the like.

In some examples, data may be received from a plurality of other sources including various computing devices of the user. For instance, a user cell phone may capture movement data, location data, use data, biometric data, and the like. Remote user computing device 150 may be a user cell phone and may capture this data and transmit it to the secure access control computing platform 110.

Further, a user may have a plurality of IoT devices at work, home, in a car, or the like. For instance, user appliances, light fixtures, and the like, may be IoT devices that capture data (e.g., movement data, timing of movement, user pattern data, and the like).

In some examples, this data may be received by secure access control computing platform 110 and used to train a machine learning model, as well as generate a user specific baseline for various types of user authentication data. For instance, the data may be used to establish user specific baseline typing pattern data, movement data, biometric data, location pattern data, and the like.

Secure access control computing platform 110 may then receive, for example, on a continuous or near continuous basis, additional data from the one or more user data sources. The additional data may be analyzed (e.g., continuously or near-continuously) to continuously confirm the user is authenticated and provide or prevent access to computing devices, applications, databases or other data sources, physical locations, and the like, based on the analysis.

If an anomaly from an expected or baseline value is detected, the system may further evaluate the data and/or data source to determine a confidence or weighting score for a particular data source or type of data. Based on the evaluation, a response action may be generated and transmitted to one or more systems or devices for execution.

Internal entity computing system 120 may be or include one or more computing devices (e.g., servers, server blades, or the like) and/or one or more computing components (e.g., memory, processor, and the like) and may host or execute one or more enterprise organization applications, systems, or the like. Accordingly, internal entity computing system 120 may execute response actions to prevent access to systems, data, or the like. In some examples, internal entity computing system 120 may control location access systems (e.g., radio frequency identification access systems) and may enable or disable access for a user based on analyzed continuous authentication data.

Internal entity user computing device 130 may be or include one or more computing devices, such as desktop computers, laptop computers, tablet computers, smartphones, wearable devices such as smart watches or augmented reality glasses, or the like. In some examples, internal entity user computing device 130 may be associated with the enterprise organization and used by a user during a course of business for the enterprise organization. Accordingly, use data associated with internal entity user computing device 130 may be captured (e.g., login credentials, typing data (e.g., speed, pattern, or the like), mouse input data (e.g., speed, accuracy, or the like), and the like, may be captured based on user interaction with the internal entity user computing device 130. In some examples, internal entity user computing device 130 may be used by a user to access one or more enterprise organization applications, systems, databases, or the like, and may be used to execute one or more response actions (e.g., provide or prevent access) based on the analysis of the continuous authentication user data.

Remote user computing device 150 and/or remote user computing device 155 may be or include computing devices such as desktop computers, laptop computers, tablets, smartphones, wearable devices, and the like, that may be associated with a user (e.g., outside of employment with the enterprise organization). The remote user computing device 150 and/or remote user computing device 155 may be associated with one or more users and may capture data during a course of a day (e.g., location data, movement data, biometric data, body rhythms, and the like). The data may then be analyzed to establish baseline data for the user and subsequent data may be received to be analyzed to authenticate the user on a continuous or near-continuous basis.

IoT device 160 and/or IoT device 165 may be or include any device connected to the Internet and/or in communication via the Internet (e.g., IoT devices). For instance, such IoT devices may include devices such as sensors, actuators, appliances, televisions, light fixtures, and the like, that may connect to the Internet and transmit data wirelessly. IoT device 160 and/or IoT device 165 may be configured to transmit data to the secure access control computing platform 110 to build baseline profile data for a user and/or determine whether the user is authenticated on a continuous or near-continuous basis.

As mentioned above, computing environment 100 also may include one or more networks, which may interconnect one or more of secure access control computing platform 110, internal entity computing system 120, internal entity user computing device 130, remote user computing device 150, remote user computing device 155, IoT device 160, and/or IoT device 165. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, secure access control computing platform 110, internal entity computing system 120, internal entity user computing device 130, may be associated with an enterprise organization (e.g., a financial institution), and private network 190 may be associated with and/or operated by the organization, and may include one or more networks (e.g., LANs, WANs, virtual private networks (VPNs), or the like) that interconnect secure access control computing platform 110, internal entity computing system 120, internal entity user computing device 130, and one or more other computing devices and/or computer systems that are used by, operated by, and/or otherwise associated with the organization. Public network 195 may connect private network 190 and/or one or more computing devices connected thereto (e.g., secure access control computing platform 110, internal entity computing system 120, internal entity user computing device 130) with one or more networks and/or computing devices that are not associated with the organization. For example, remote user computing device 150, remote user computing device 155, IoT device 160, and/or IoT device 165 might not be associated with an organization that operates private network 190 (e.g., because remote user computing device 150, remote user computing device 155, IoT device 160, and/or IoT device 165 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 150, remote user computing device 155, IoT device 160, and/or IoT device 165 to private network 190 and/or one or more computing devices connected thereto (e.g., secure access control computing platform 110, internal entity computing system 120, internal entity user computing device 130).

Although IoT devices 160, 165 are shown as connected via public network 195, IoT device 160 and/or IoT device 165 may be connected to private network 190 without departing from the invention.

Referring to FIG. 1B, secure access control computing platform 110 may include one or more processors 111, memory 112, and communication interface 113. A data bus may interconnect processor(s) 111, memory 112, and communication interface 113. Communication interface 113 may be a network interface configured to support communication between secure access control computing platform 110 and one or more networks (e.g., network 190, network 195, or the like). Memory 112 may include one or more program modules having instructions that when executed by processor(s) 111 cause secure access control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of secure access control computing platform 110 and/or by different computing devices that may form and/or otherwise make up secure access control computing platform 110.

For example, memory 112 may have, store and/or include registration module 112a. Registration module 112a may store instructions and/or data that may cause or enable the secure access control computing platform 110 to receive user registration data. In some examples, the user registration data may include user identifying data, device identifying data including unique identifiers associated with one or more computing devices of the user, IoT devices of the user, or the like. In some examples, enterprise organization data associated with the user may also be received. For instance, physical location access information (e.g., areas the user is permitted to enter or restricted from entering), data access information (e.g., applications, databases, and the like the user is permitted to access or restricted from accessing), a physical access device identifier (e.g., radio frequency identifier access key, or the like) associated with the user, and the like. In some examples, the registration data may be used to build a user profile of the user. The user profile may be stored in a database (e.g., database 112f) and may include the registration data provided. The profile may then be modified to include baseline user authentication data generated from user data received from one or more user data sources (e.g., computing devices, IoT devices, and the like, associated with the user).

Secure access control computing platform 110 may further have, store and/or include internal device data collection module 112b. Internal device data collection module 112b may store instructions and/or data that may cause or enable the secure access control computing platform 110 to receive data from one or more data sources internal to the enterprise organization. For instance, data from internal entity user computing device 130, IoT devices associated with the enterprise organization, location and/or access permission data within the enterprise organization, and the like, may be received and captured by the internal device data collection module 112b.

Secure access control computing platform 110 may further have, store and/or include external device data collection module 112c. External device data collection module 112c may store instructions and/or data that may cause or enable the secure access control computing platform 110 to receive data from one or more data sources external to the enterprise organization. For instance, data from one or more remote user computing devices 150, 155, one or more IoT devices external to the enterprise organization, and the like, may be received and captured by external device data collection module 112c.

In some examples, internal device data collection module 112b and/or external device data collection module 112c may evaluate received data to determine a weighting value or confidence factor or score for each data source, type of data, or the like. For instance, based on consistency of data, amount of data, reliability of data source, or the like, a confidence score may be determined for each data source, each type of data, or the like. The confidence scores may then be used in determined one or more response actions to identify and execute.

Secure access control computing platform 110 may further have, store and/or include machine learning engine 112d. Machine learning engine 112d may store instructions and/or data that may cause or enable the secure access control computing platform 110 to train, execute, validate and/or update one or more machine learning models that may be used to determine build baseline data profiles for a user, analyze subsequently received data to detect anomalies from baseline or expected data, and the like. In some examples, the machine learning model may be trained (e.g., user data received from one or more data sources captured by internal device data collection module 112b, external device data collection module 112c, and the like) to identify patterns or sequences in data that may indicate a baseline profile for each particular type of data captured. For instance, a user may have baseline typing data (e.g., speed, accuracy, pressure, or the like), baseline mouse data (e.g., speed, accuracy, and the like), baseline movement data within the enterprise organization (e.g., repeated movement to or from a particular location such as an office or work station, repeated movement to a secondary location such as a datacenter, or the like), baseline movement data outside the enterprise organization (e.g., within the user's home, between the enterprise organization and home, or the like), baseline IoT device interaction data (e.g., patterns of accessing particular appliances), baseline biometric data (e.g., body rhythms patterns), and the like. In some examples, the baseline profile data for each type of data may be determine for different times of day or periods throughout the day (e.g., early morning, mid-day, late evening, or the like), different days of the week, different seasons or times of year, or the like. Accordingly, each user may have a plurality of user specific baseline data profiles for various different types of data.

The machine learning model may then analyze subsequently received data to detect anomalies from the baseline user data. For instance, the machine learning model may receive, as inputs, continuous or near-continuously captured data from a plurality of data sources (e.g., movement data, location data, biometric data, device interaction data, or the like) and may output, based on execution of the machine learning model, a determination of whether an anomaly exists. The determination, as well as any response actions executed in response to the determination may be received by the machine learning model (e.g., via a feedback loop) to update, validate, refine, or further train the machine learning model. Accordingly, the model may be continuously or near continuously updated or validated to continue to improve accuracy.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Secure access control computing platform 110 may further have, store and/or include authentication module 112e. Authentication module 112e may store instructions and/or data that may cause or enable the secure access control computing platform 110 to receive the determination output by the machine learning model, evaluate one or more confidence scores associated with the anomalous data, non-anomalous data, and the like, and identify one or more response actions for execution. For instance, if it is determined that a user is not authenticated (e.g., based on the continuously analyzed data), a response action may be identified that may include preventing access to one or more physical locations, applications, databases, computing devices, or the like. Instructions to execute the response actions may be generated and sent to one or more computing devices for execution.

Secure access control computing platform 110 may further have, store and/or include database 112f. Database 112f may store user profile data (e.g., baseline data, authentication output data, or the like), registration data, and/or other data that enables performance of the aspects described herein by the secure access control computing platform 110.

FIGS. 2A-2F depict one example illustrative event sequence for implementing continuous authentication and secure access control in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
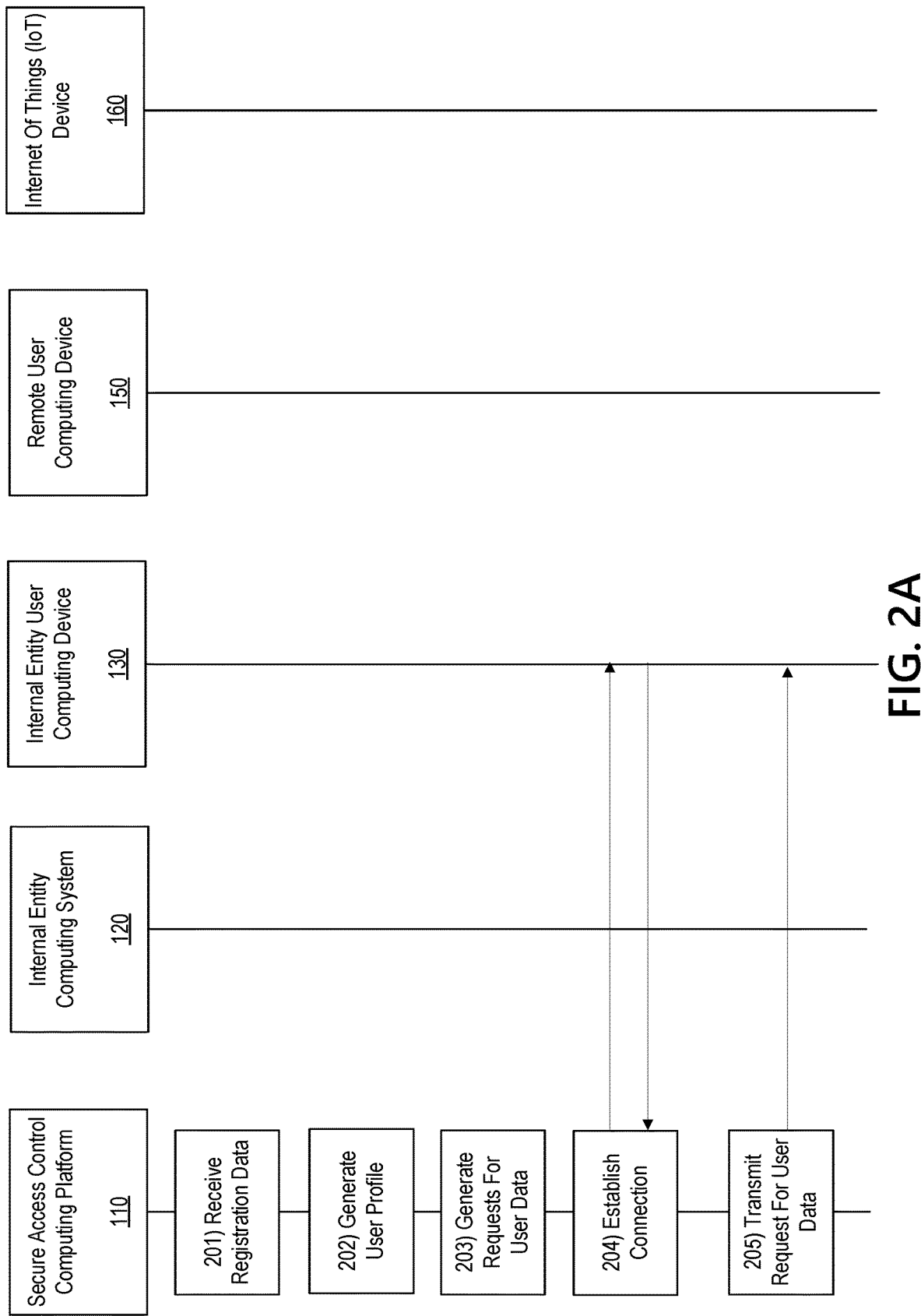

With reference to FIG. 2A, at step 201, secure access control computing platform 110 may receive registration data. In some examples, registration data may be received from a plurality of users and may include user identifying information, user device identifying information, user enterprise access information, and the like.

At step 202, secure access control computing platform 110 may generate a user profile entry for each user. In some examples, the user profile entry may be stored in a database, such as database 112f, and may include the registration data received for each user.

At step 203, secure access control computing platform 110 may generate one or more requests for user data. For instance, secure access control computing platform 110 may generate a request for user data for a particular user. The request may include a request for continuous or near-continuous user data captured by a respective data source (e.g., computing device, IoT device, or the like) to be transmitted to the secure access control computing platform 110. In some examples, the data may be sent in a data stream. Additionally or alternatively, the data may be sent in batches on a periodic or aperiodic basis. In some examples, a request for user data may be generated for each data source. Additionally or alternatively, one request for data may be generated and transmitted to the plurality of data sources associated with the user.

At step 204, secure access control computing platform 110 may establish a connection with the internal entity user computing device 130. For instance, a first wireless connection may be established between the secure access control computing platform 110 and the internal entity user computing device 130. Upon establishing the first wireless connection, a communication session may be initiated between the secure access control computing platform 110 and the internal entity user computing device 130.

At step 205, the secure access control computing platform 110 may transmit or send the generated request for user data to the internal entity user computing device 130. For instance, the request for user data may be transmitted or sent during the communication session initiated upon establishing the first wireless connection.

Figure 2B:
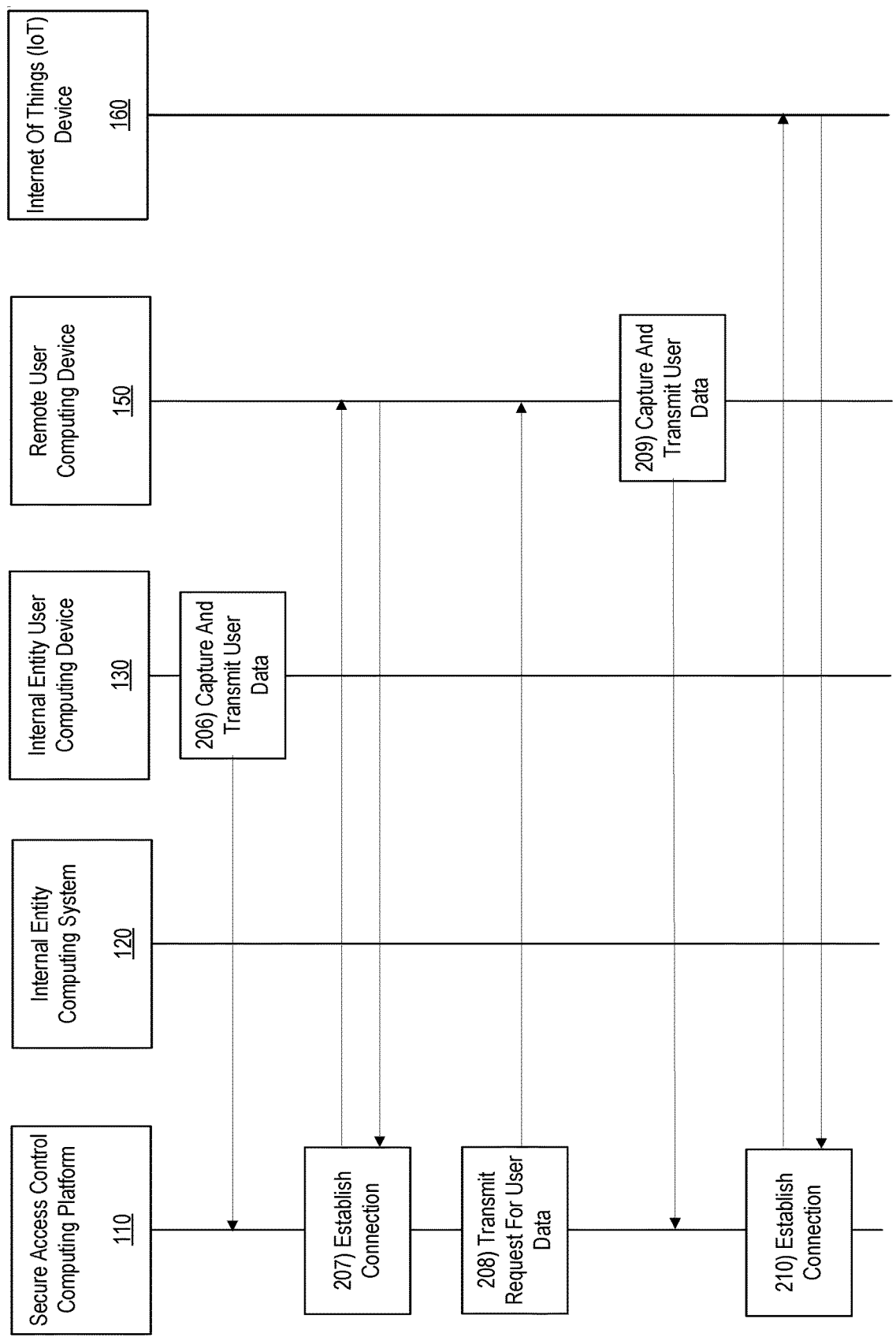

With reference to FIG. 2B, at step 206, internal entity user computing device 130 may capture and send user data associated with the user. For instance, internal entity user computing device 130 may capture, e.g., during a course of business, user interaction data with one or more user input devices, such as a mouse, keyboard, or the like. Accordingly, data associated with user typing pattern, speed, accuracy, mouse speed, and the like, may be captured and sent to the secure access control computing platform 110.

At step 207, secure access control computing platform 110 may establish a connection with the remote user computing device 150. For instance, a second wireless connection may be established between the secure access control computing platform 110 and the remote user computing device 150. Upon establishing the second wireless connection, a communication session may be initiated between the secure access control computing platform 110 and the remote user computing device 150.

At step 208, the secure access control computing platform 110 may transmit or send the generated request for user data to the remote user computing device 150. For instance, the request for user data may be transmitted or sent during the communication session initiated upon establishing the second wireless connection.

At step 209, remote user computing device 150 may capture and send user data associated with the user. For instance, remote user computing device 150 may capture, e.g., during a course of a day or other time period, movement data of the user, location data of the user, biometric data of the user (e.g., body rhythms, and the like), user interaction data (e.g., with input devices such as a touchscreen or keypad), and the like. Accordingly, data associated with user typing or touchscreen selections, typical speed of walking, patterns of movement within a location or between locations, and the like, may be captured and sent to the secure access control computing platform 110.

At step 210, secure access control computing platform 110 may establish a connection with IoT device 160. For instance, a third wireless connection may be established between the secure access control computing platform 110 and the IoT device 160. Upon establishing the third wireless connection, a communication session may be initiated between the secure access control computing platform 110 and the IoT device 160.

Figure 2C:
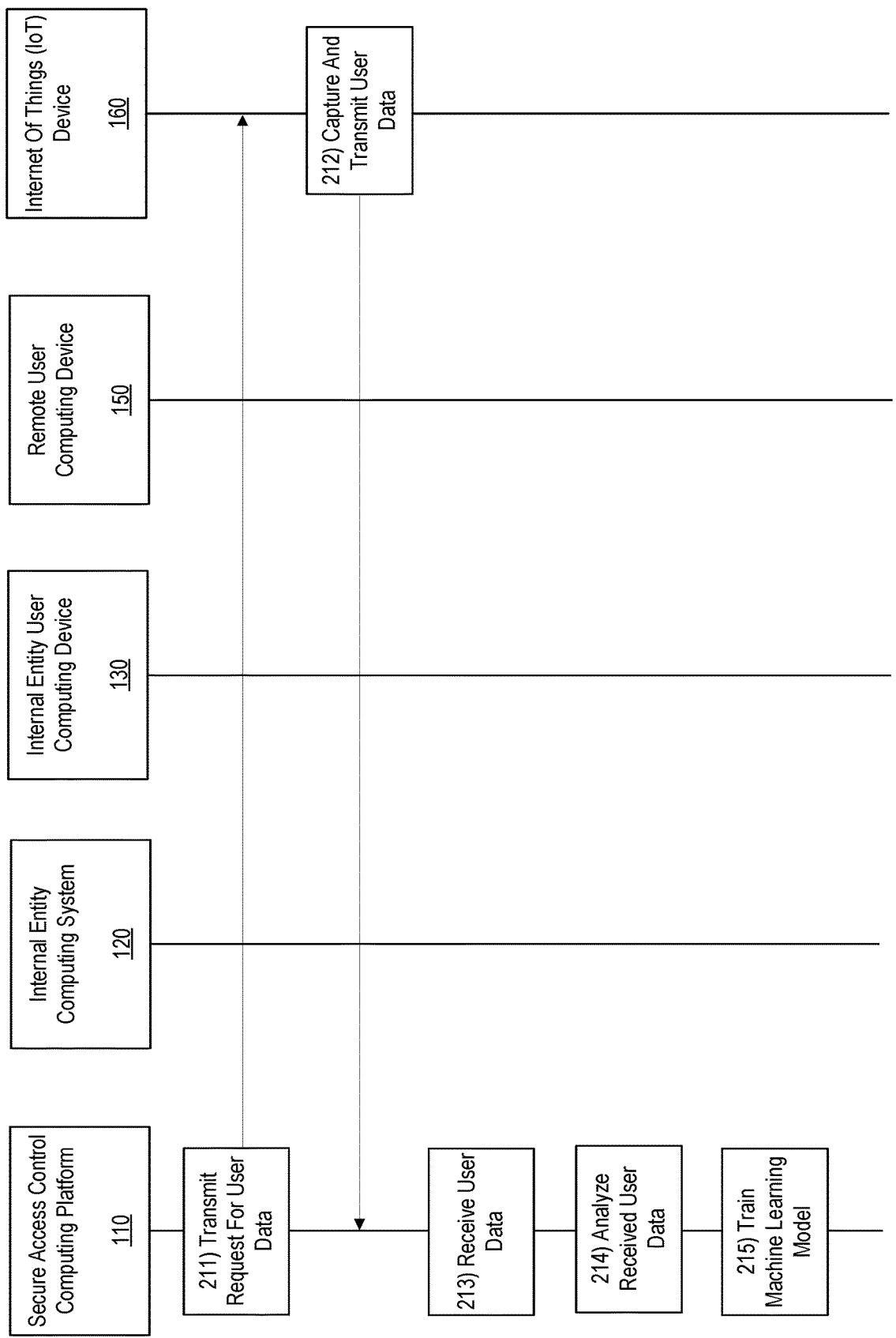

With reference to FIG. 2C, at step 211, the secure access control computing platform 110 may transmit or send the generated request for user data to the IoT device 160. For instance, the request for user data may be transmitted or sent during the communication session initiated upon establishing the third wireless connection.

At step 212, IoT device 160 may capture and send user data associated with the user. For instance, IoT device 160 may capture, e.g., during a course of a day or other time period, at a user home or work place, or the like, user interaction data with one or more IoT devices. For instance, data such as movement data, location data, patterns of use, frequency of use, accessibility in one or more physical locations, and the like, may be captured and sent to the secure access control computing platform 110.

Although FIGS. 2A-2C illustrate data being received from one internal entity user computing device 130, one remote user computing device 150, and one IoT device 160, data may be received from more than one of the one or more types of devices. Further, data may be received from some sources for multiple users (e.g., IoT devices may captured data associated with multiple users and may transmit the data for all users, a subset of users, or the like). In examples in which data is captured by a device for a plurality of users, in some examples, a detected signal from a user device, such as remote user computing device 150, may be associated with data to identify a user associated with the data being captured. Further, data may be captured at a point in time, over a period of time, or the like, and then transmitted to the secure access control computing platform 110 for analysis and use in building baseline profiles and evaluating authentication.

At step 213, secure access control computing platform 110 may receive the user data from a plurality of user data sources (e.g., computing devices, IoT devices, and the like).

At step 214, the received data may be analyzed, grouped, formatted or otherwise processed. In some examples, received data may be labelled for use in training the machine learning model. In some examples, a weight or importance factor may be assigned to each type of data, each data source, or the like. For instance, data received from the internal entity user computing device 130 may carry more importance than data received from IoT device 160 and, accordingly, may be assigned a weighting factor indicative of the relative importance. In some examples, analyzing the data may include assigning a confidence factor or score to each type of data, data source, or the like. For instance, biometric data received from a remote user computing device 150 may be somewhat less accurate than movement data captured by the remote user computing device 150. Accordingly, a higher confidence score may be assigned to the movement data than the biometric data.

At step 215, secure access control computing platform 110 may train a machine learning model. For instance, secure access control computing platform 110 may train the machine learning model using the user data received from the plurality of sources. In some examples, the user data may be received over a period of time, until a threshold amount of data is received, or the like, and used to train the machine learning model. In some examples, training the model may include labeling data associated with a user (e.g., type of data, data source, time of day, day of week, workday vs. non-workday, and the like) in order to train the model to identify patterns or sequences in data, output detected anomalies, and the like.

Figure 2D:
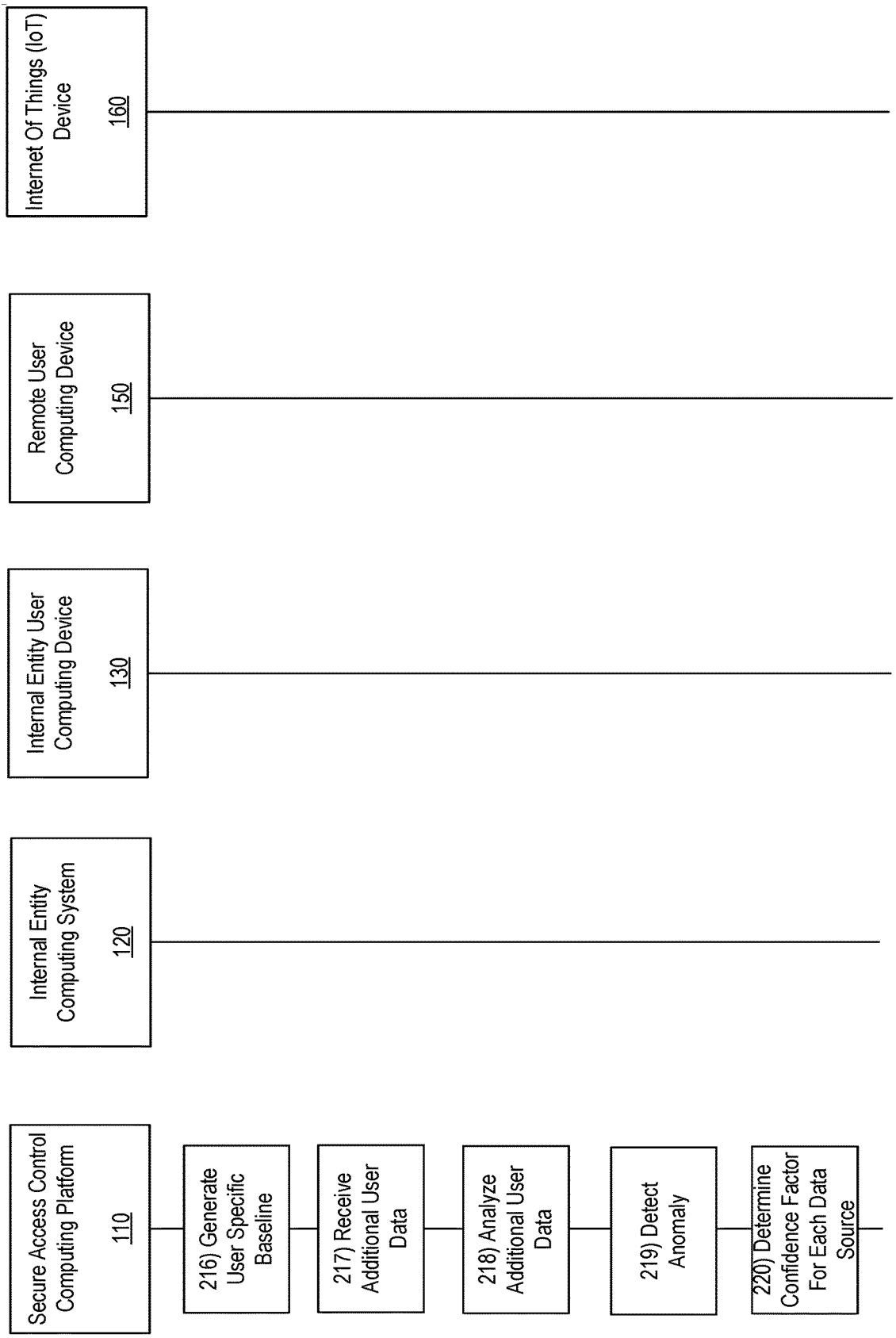

With reference to FIG. 2D, at step 216, secure access control computing platform 110 may generate user specific baseline data. For instance, the machine learning model may be used to generate or identify baseline user patterns of data for each data source, type of data, for particular times of day, days of week, or the like. Upon generating the user specific baseline data, secure access control computing platform 110 may modify a user profile of a respective user to store the user specific baseline data.

At step 217, secure access control computing platform 110 may receive additional user data. For instance, additional data may be continuously received from one or more data sources (e.g., internal entity user computing device 130, remote user computing device 150, IoT device 160, and the like). The additional data may be captured by the respective devices at a time subsequent to the earlier received data.

At step 218, the secure access control computing platform 110 may analyze the additional data. For instance, the received additional data may be analyzed, formatted, or the like, and input into the machine learning model. The machine learning model may be executed to output a detected or likely anomaly (e.g., a difference between an expected or baseline value or pattern and an actual value or pattern identified in the additional data). In some examples, to be detected as an anomaly the difference must be at least a threshold percentage different (e.g., 5%, 10%, 25% or the like). In some examples, the threshold may vary based on the type of data, data source, weight of the data source or data type, confidence associated with the data source or data type, or the like.

At step 219, based on the machine learning analysis, an anomaly may be detected. In some examples, the output indicating the detected anomaly may include identification of the type of data (e.g., movement data, biometric data, typing data, or the like), data source (e.g., internal entity user computing device 130, remote user computing device 150, or the like). In some examples, the output may include an indication of a scope of difference between the analyzed data and the baseline data. For instance, an indication that the data was within x % of baseline may be provided.

At step 220, a confidence factor and/or weighting value may be determined or identified for each type of data, data source, of the like. For instance, a confidence factor and/or weighting value may be determined for the type of data in which the anomaly was detected, as well as the data source from which the data was received. Further, confidence and/or weighting values may be determined for the other types of data and data sources (e.g., in the inputs to the model other than the anomalous data and source). In some examples, the confidence factor and/or weighting value may be retrieved from the user profile (e.g., as determined when generating baseline profile data). In other examples, a confidence factor and/or weighting value may be determined based on reliability of the data source, consistency of data type, or the like.

Figure 2E:
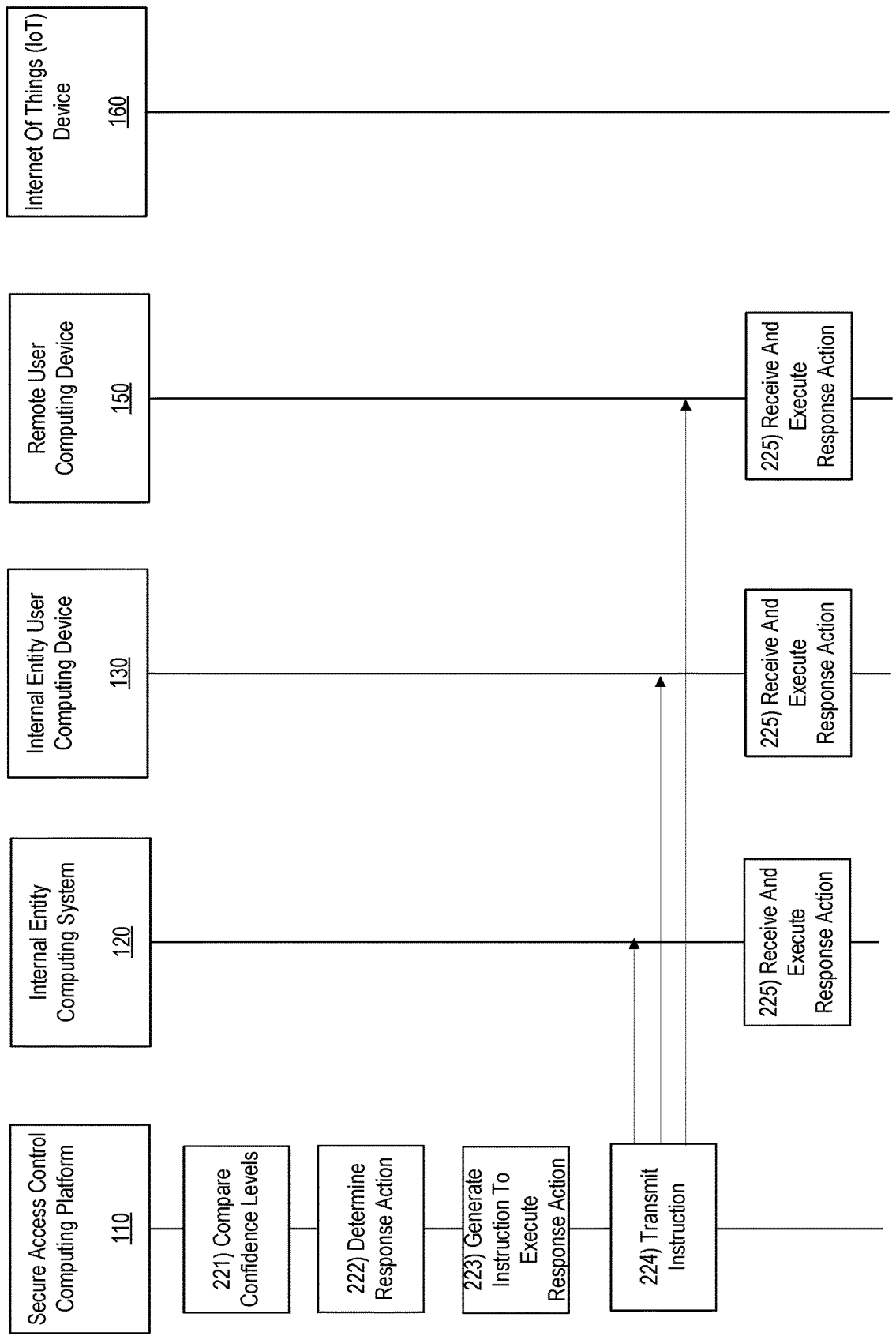

With reference to FIG. 2E, at step 221, secure access control computing platform 110 may compare confidence factors and/or weighting values. For instance, if a weighting value exists for a data source or type of data, a confidence factor may be multiplied by the weighting value for the data type, data source, or the like. The confidence factor or weighted confidence factor for the data type and data source associated with the anomaly may be compared to confidence factors or weighted confidence factors for other data types and data sources (e.g., the other data types and data sources input with the anomalous data into the machine learning model). In some examples, the confidence factor or weighted confidence factor of the anomalous data type and associated data source may be averaged and compared to an average of the confidence factors or weighted confidence factors of the remaining data types and associated data sources (e.g., the machine learning model may receive, as inputs, a plurality of data types from a plurality of data sources. Anomalous data types and associated sources may have confidence factors or weighted confidence factors averaged and compared to confidence factors or weighted confidence factors of data types and associated data sources of the remainder of the plurality of data types and data sources).

At step 222, based on the comparing, secure access control computing platform 110 may identify or generate one or more response actions. For instance, if the confidence factor or weighted confidence factor of the anomalous data is higher than the remaining data, one or more response actions may be generated. In some examples, the response actions may include limiting or preventing access to particular applications, databases, physical locations, or the like. For example, a user may be considered no longer authenticated and may be locked out of one or more computing devices (e.g., internal entity user computing device 130), applications, data sources, physical locations, or the like if the confidence is high that the anomalous data indicates the user is not authenticated. Alternatively, if the anomalous data confidence is lower than the remaining data, in some examples, a response action may include a request for a user to provide additional authentication data (e.g., biometric data, password, produce an actual radio frequency access key, or the like) before proceeding. Response actions may be generated or identified for execution by one or more data sources, computing devices of the user, or the like. In some examples, a response action may include one or more notifications indicating the detected anomaly, modifications to systems or access, and the like.

At step 223, secure access control computing platform 110 may generate one or more instructions to execute the identified or generated response actions.

At step 224, secure access control computing platform 110 may transmit or send the generated instructions to one or more devices, such as internal entity computing system 120, internal entity user computing device 130, remote user computing device 150, or the like. For instance, the instruction may include an instruction to prevent access to a device or application. Accordingly, if the application is hosted by internal entity computing system 120, the response action may be sent to that system for execution (e.g., modification of access or permission files, or the like). Further, the instruction may proactively lock the user out of the application and, accordingly, the instruction may be sent to one or more of internal entity user computing device 130 and/or remote user computing device 150 (e.g., devices the user may use to access the application) to prevent the user from accessing the application in a current session.

Figure 4:
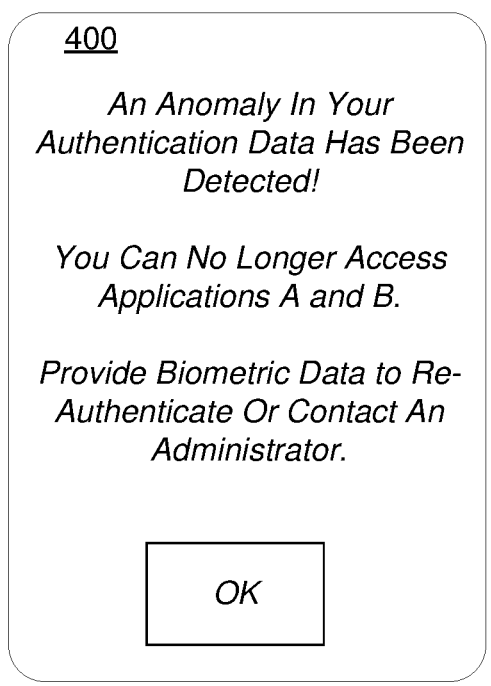
FIG. 4 illustrates one example user interface that may be generated in accordance with one or more aspects described herein.

At step 225, the devices to which the instruction(s) were sent may receive and execute the instruction and associated response action. In some examples, the response action may include a notification and executing the response action may include causing display of the notification on a receiving device. For instance, remote user computing device 150 may display a notification similar to the interface 400 shown in FIG. 4, indicating that an anomaly was detected, that access to multiple applications has been prevented and providing instructions to the user. The interface 400 is merely one example interface. Various other interfaces may be used without departing from the invention.

With reference to FIG. 2F, at step 226, the machine learning model may be refined, updated, validated, or the like, based on the additional analyzed data, as well as any response actions executed in response to anomalous data (e.g., based on a dynamic feedback loop). Accordingly, the machine learning model may be continuously, or near-continuously, updated to improve accuracy in detecting anomalous data.

At step 227, further data may be received from one or more data sources and the process may continue with machine learning analysis of the further data. Accordingly, the further data may be continuously received and the process may continue. As such, a user may be continuously or near-continuously authenticated at a plurality of times during a day as the user goes about their day. In some examples, the continuous authentication may be seamless to the user such that data is collected and analyzed and, only if an anomaly is detected (e.g., of sufficient confidence or importance) will the user be aware of the continuous authentication process going on around them. The arrangements rely on a plurality of devices and data sources to ensure accuracy of authentication and that continuous authentication may continue even if one or more data sources are unavailable.

Figure 3:
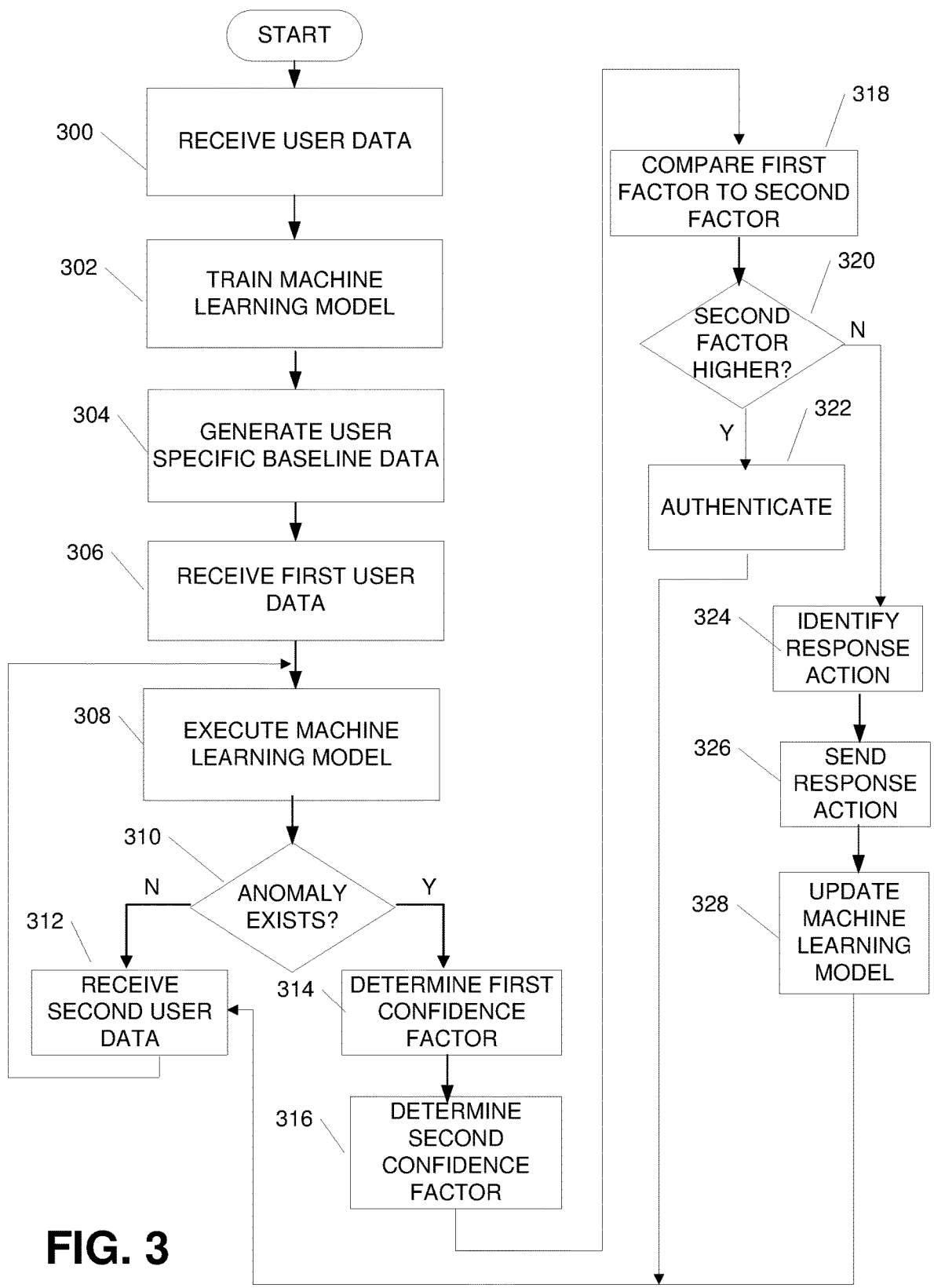
FIG. 3 depicts an illustrative method for implementing continuous authentication and secure access control in accordance with one or more aspects described herein.

FIG. 3 is a flow chart illustrating one example method of continuous authentication and secure access control in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive, from a plurality of data sources, user data captured based on user interactions with each data source of the plurality of data sources. For instance, as a user interacts with a first data course (e.g., internal entity user computing device 130), second data source (e.g., remote user computing device 150) and/or third data source (IoT device 160), user interaction data may be captured and transmitted to the computing platform.

At step 302, the computing platform may train a machine learning model using the received user data. In some examples, training the machine learning model may include labeling the received user data based on data type, data source, or the like.

At step 304, the machine learning model may be used to generate user specific baseline data. For instance, upon receiving at least a threshold amount of data, the machine learning model may be used to determine or generate user specific baseline data. In some examples, the user specific baseline data may include a plurality of baseline data profiles for a user. For instance, baseline data profiles may be generated for each user and may be based on type of data, data source, time of day at which the data was captured, day of week on which the data was captured, or the like. The baseline data profiles may be stored by the computing platform in a user profile.

At step 306, first user data may be for a user may be received from the plurality of data sources. In some examples, the first user data may include a plurality of data types.

At step 308, the computing platform may execute the machine learning model using the first user data as inputs. Executing the machine learning model may cause the machine learning model to output whether an anomaly is detected in at least one data type of the plurality of data types and from at least one data source of the plurality of data sources, between the first user data and the user specific baseline data.

At step 310, the computing platform may determine whether an anomaly has been detected. If, at step 310, an anomaly is not detected, at step 312 second user data may be received from the plurality of data sources. The process may then return to step 308 to execute the machine learning model using the second user data as inputs to evaluate the second user data for anomalies.

If, at step 310, an anomaly is detected, at step 314, a first confidence factor may be determined for the at least one data type of the plurality of data types and the at least one data source of the plurality of data sources.

At step 316, the computing platform may determine a second confidence factor for a remainder of the data types of the plurality of data types and a remainder of the data sources of the plurality of data sources. In some examples, the second confidence factor may be determined for all data types of the plurality of data types except the data type in which the anomaly was detected, and for all data sources of the plurality of data sources except the data source associated with the anomalous data.

At step 318, the computing platform may compare the first confidence factor to the second confidence factor.

At step 320, a determination may be made as to whether the second confidence factor is higher than the first confidence factor. If so, at step 322, the user may be authenticated and the process may continue to capture and analyze second user data at step 312.

If, at step 320, the second confidence factor is not higher than the first confidence factor, the computing platform may identify at least one response action at step 324. As discussed, the response action may include preventing access to one or more applications, devices, physical locations, or the like.

At step 326, the at least one response action may be transmitted or sent to a computing device (e.g., a computing device associated with the user, such as internal entity user computing device 130, remote user computing device 150, or the like). In some examples, sending the at least one response action may cause the computing device to execute the response action.

At step 328, the computing platform may update the machine learning model based on the detected anomaly and response action. The process may then proceed to capture and analyze second (or subsequent) data at step 312.

As discussed above, aspects herein provide a robust, holistic system for authenticating users on a continuous basis. In some examples, passive data may be captured and used to authenticate the user seamlessly and without requiring user interaction (or user interaction beyond a normal course of business, personal time, or the like). By capturing data, with permission, from various data sources, a user may be dynamically, continuously and reliably authenticated to multiple devices, systems, or the like without the use (or limiting the use) of static authentication data. Accordingly, even if a static authenticator (e.g., password or the like) of the user is accessed by an unauthorized user, the data captured from the plurality of data sources described herein may be used to reliably authenticate the user. Aspects described here may also be used as a standalone system of authentication or in conjunction with traditional authentication factors (e.g., password, biometrics, or the like).

Aspects described herein may rely on data captured from a plurality of data sources (e.g., computing devices, virtual or augmented reality devices, IoT devices, and the like) to provide holistic authentication on a continuous basis. By capturing and analyzing data from a plurality of sources, a user may reliably be authenticated even if a single anomaly occurs or data from one or more devices is not available for analysis.

As discussed herein, IoT devices may be a convenient source of data for continuous authentication since many IoT devices exist in work environment, home environment, and the like. Accordingly, pinging between a user's mobile or other device and various IoT devices may be continuous as a user moves from room to room at work or home, from building to building at work, or the like. This data may all feed into the continuous authentication aspects described herein. This data may be useful particularly when evaluating geolocation patterns of a user.

As also discussed herein, baseline data profiles may be generated for each user and may include multiple data profiles. Accordingly, to build the baseline data profiles, data may be captured over time to build user specific baseline data profiles for various times of day, days of week, seasons, or the like. Accordingly, subsequent data being analyzed may be compared to user specific baseline data for a similar time of day, day of week, or the like, to ensure optimal accuracy and account for natural changes in user actions over time, on different days, or the like.

Aspects described herein include identifying and executing one or more response actions in response to a detected anomaly in the authentication data. In some examples, confidence factors may be used to determine when to execute a response action. Additionally or alternatively, anomalies in particular types of data may result in particular response actions. For instance, anomalies in a first category of data type, data source, or the like, may cause execution of one response action while an anomaly in a second category of data type or data sources may cause execution of a second, different response action. In some example, if an anomaly is detected in IoT data from light fixtures in a user's office, a response action may include preventing a user from editing documents or a database until a supervisor is alerted, the user re-authenticates using other authentication factors, or the like. In another example, if an anomaly is detected in a user's typing or speech pattern, the user may be prevented from accessing any enterprise organization computing devices until authentication is confirmed. Various other examples may be used without departing from the invention.

In some examples, weighting factors or values used to weight different types of data or data sources may change based on a situation. For instance, in the morning, when a user may be rushing to get to work, the user's typing may be more prone to errors and, accordingly, user input data may be weighted less during that time period. Various other changes in weighting values may be used without departing from the invention.

In some examples, data types and/or data sources may be clustered and different clusters categorized. Accordingly, if data in a high priority cluster is anomalous, more severe or restrictive response actions may be executed than if the data in a lower priority cluster is anomalous.

Further, the confidence factors, weighting values, and other criteria for authenticating a user even when anomalous data is present may include a tolerance that may be modified based on type of application (e.g., high security applications may have more stringent requirements), physical location being accessed (e.g., a bank vault may require more stringent requirements), or the like.

As discussed herein, data may be captured from a plurality of data sources and used to authenticate users to various applications, systems, devices, provide access to locations, and the like. Accordingly, users may be authenticated and permitted to access applications on a first device based on authentication data captured from one or more other devices.

In some examples, the continuous authentication aspects described herein may be used to provide access to secure physical locations within the need for a user to scan a radio frequency identification key. For instance, if sufficient continuous authentication data is present and not anomalous, a user may be provided access to one or more physical locations without a key swipe and based on the continuous authentication.

Further, various types of biometric data may be used to continuously authenticate a user. For instance, biometric data captured via, for instance, a fitness tracker, may be used to build baseline data and detect anomalies in subsequent data. In some examples, the physical aspects of the user may be considered. For instance, a user's height may be determined and used to identify a baseline range of positions at which a mobile device may be positioned on the user (e.g., at a height corresponding to a pocket to a height corresponding to an car of the user). If position data of the mobile device is outside that range, an anomaly may be detected.

Various arrangements described herein may also be used to provide a duress signal. For instance, a user may be requested to provide fingerprint data as authentication and may have a predetermined number of fingers or particular fingers to use for the scan. If a different finger or number of fingers is used, or if a-typical pressure is applied when scanning a fingerprint, that may indicate unauthorized use. Further, particular finger arrangements may be predetermined to indicate duress and the user may scan those fingers in instances where assistance may be needed. In some examples, the duress code may be predetermined and/or may change on a predetermined basis (e.g., each day, each week, or the like).

In some examples, data may be pooled to detect a duress situation. For instance, registered users within a geofenced area may have data pooled in instances in which multiple similar types of authentication data are anomalous to determine whether assistance is needed. For example, if all registered users within a building or geofenced area are showing biometric signs of stress, an issue may be occurring and assistance may be provided. In some examples, a notification of potential duress may be transmitted to one or more assistance providers, administrators, or the like.

Further, even if fewer than all users are indicating an issue, the situation might be flagged for investigation and one or more response actions (e.g., disabling elevators in case or fire, or the like) may be executed as a precaution.

Figure 5:
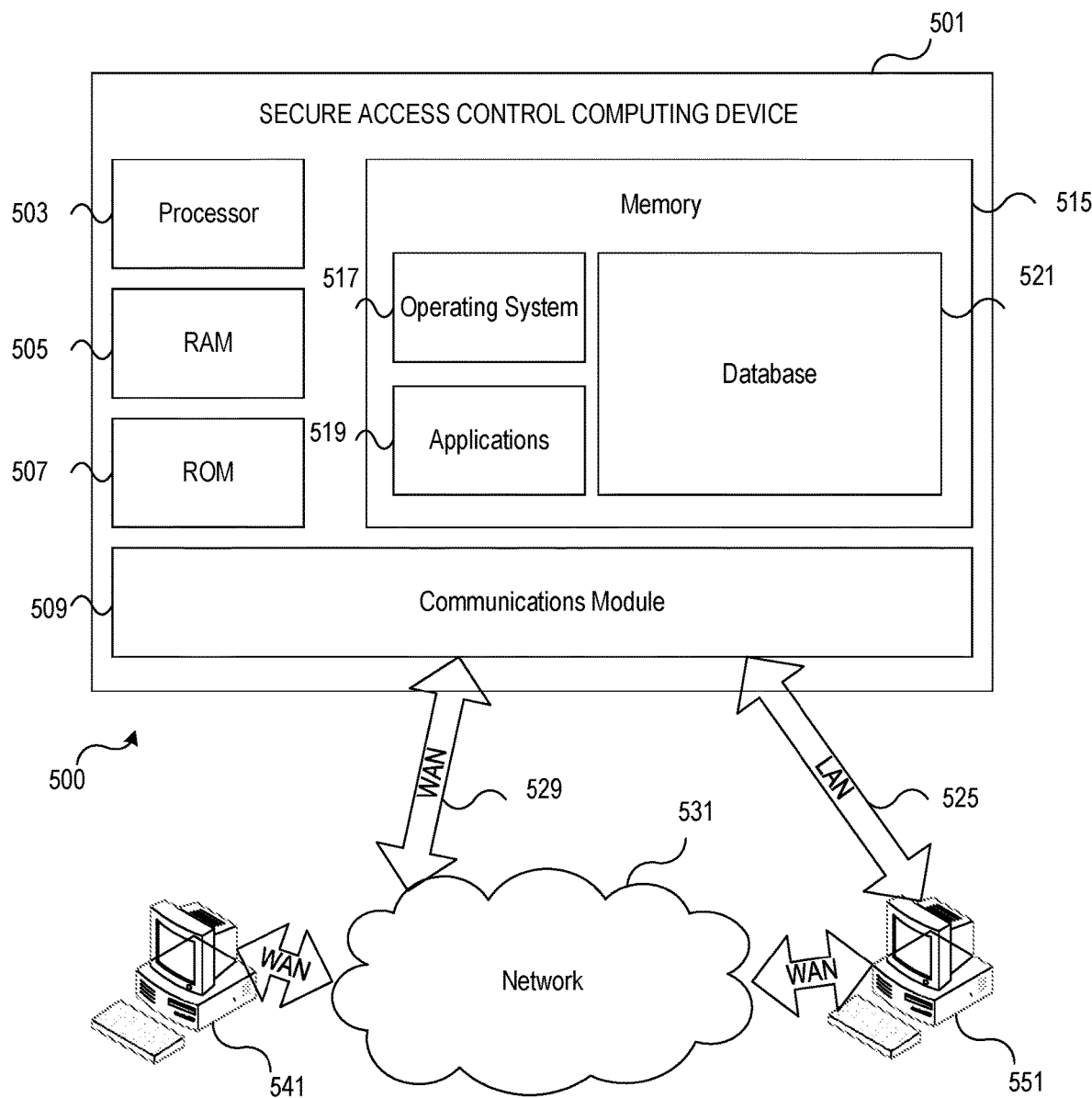
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include secure access control computing device 501 having processor 503 for controlling overall operation of secure access control computing device 501 and its associated components, including Random Access Memory (RAM) 505, Read-Only Memory (ROM) 507, communications module 509, and memory 515. Secure access control computing device 501 may include a variety of computer readable media. Computer readable media may be any available media that may be accessed by secure access control computing device 501, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by secure access control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on secure access control computing device 501. Such a processor may execute computer-executable instructions stored on a computer-readable medium.

Software may be stored within memory 515 and/or storage to provide instructions to processor 503 for enabling secure access control computing device 501 to perform various functions as discussed herein. For example, memory 515 may store software used by secure access control computing device 501, such as operating system 517, application programs 519, and associated database 521. Also, some or all of the computer executable instructions for secure access control computing device 501 may be embodied in hardware or firmware. Although not shown, RAM 505 may include one or more applications representing the application data stored in RAM 505 while secure access control computing device 501 is on and corresponding software applications (e.g., software tasks) are running on secure access control computing device 501.

Communications module 509 may include a microphone, keypad, touch screen, and/or stylus through which a user of secure access control computing device 501 may provide input, and may also include one or more of a speaker for providing audio output and a video display device for providing textual, audiovisual and/or graphical output. Computing system environment 500 may also include optical scanners (not shown).

Secure access control computing device 501 may operate in a networked environment supporting connections to one or more other computing devices, such as computing device 541 and 551. Computing devices 541 and 551 may be personal computing devices or servers that include any or all of the elements described above relative to secure access control computing device 501.

The network connections depicted in FIG. 5 may include Local Area Network (LAN) 525 and Wide Area Network (WAN) 529, as well as other networks. When used in a LAN networking environment, secure access control computing device 501 may be connected to LAN 525 through a network interface or adapter in communications module 509. When used in a WAN networking environment, secure access control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, from a plurality of data sources, user data captured based on user interactions with each data source of the plurality of data sources;
train, using the user data captured based on the user interactions with each data source of the plurality of data sources, a machine learning model;
generate, using the machine learning model, user specific baseline data;
receive, from the plurality of data sources, first user data, the first user data including a plurality of data types;
execute, using the first user data as inputs, the machine learning model to output whether an anomaly is detected in at least one data type of the plurality of data types and from at least one data source of the plurality of data sources, between the first user data and the user specific baseline data;
responsive to not detecting an anomaly in the at least one data type of the plurality of data types and from the at least one data source of the plurality of data sources, receive second user data and execute, using the second user data as inputs, the machine learning model to output whether an anomaly exists in the second user data;
responsive to detecting an anomaly in the at least one data type of the plurality of data types and from the at least one data source of the plurality of data sources:
determine a first confidence factor for the at least one data type of the plurality of data types and the at least one data source of the plurality of data sources;
determine a second confidence factor for a remainder of the data types of the plurality of data types and a remainder of the data sources of the plurality of data sources;
compare the first confidence factor to the second confidence factor to determine a higher confidence factor;
responsive to determining the second confidence factor is higher than the first confidence factor, authenticate the user;
responsive to determining the first confidence factor is higher than the second confidence factor:
identify a response action;
send, to at least one computing device, the identified response action for execution, wherein sending the identified response action causes the at least one computing device to execute the response action; and
update the machine learning model based on the detecting the anomaly and the response action.

2. The computing platform of claim 1, wherein the plurality of data sources includes computing devices associated with a user and Internet of Things (IoT) devices associated with the user.

3. The computing platform of claim 1, wherein the plurality of data types includes at least one of: movement data, location data, typing patterns, typing speed, typing accuracy, or mouse speed.

4. The computing platform of claim 1, wherein the response action includes at least one of: preventing access to a computing device, preventing access to an application, preventing access to a database, or preventing access to a physical space.

5. The computing platform of claim 1, wherein the user data captured based on user interactions with each data source of the plurality of data sources is captured at various times of day and days of a week.

6. The computing platform of claim 5, wherein the user specific baseline data is specific to at least one of: the time of day or day of the week.

7. The computing platform of claim 1, wherein subsequent user data is received on a continuous basis.

8. The computing platform of claim 7, wherein the subsequent user data is received on a continuous basis via a data stream.

9. The computing platform of claim 7, wherein the subsequent user data is received on a continuous basis via a batch process.

10. A method, comprising:
receiving, by a computing platform, the computing platform having at least one processor and memory, and from a plurality of data sources, user data captured based on user interactions with each data source of the plurality of data sources;
training, by the at least one processor and using the user data captured based on the user interactions with each data source of the plurality of data sources, a machine learning model;
generating, by the at least one processor and using the machine learning model, user specific baseline data;
receiving, by the at least one processor and from the plurality of data sources, first user data, the first user data including a plurality of data types;
executing, by the at least one processor and using the first user data as inputs, the machine learning model to output whether an anomaly is detected in at least one data type of the plurality of data types and from at least one data source of the plurality of data sources, between the first user data and the user specific baseline data;
responsive to not detecting an anomaly in the at least one data type of the plurality of data types and from the at least one data source of the plurality of data sources, receiving, by the at least one processor, second user data and execute, using the second user data as inputs, the machine learning model to output whether an anomaly exists in the second user data;
responsive to detecting an anomaly in the at least one data type of the plurality of data types and from the at least one data source of the plurality of data sources:

determining, by the at least one processor, a first confidence factor for the at least one data type of the plurality of data types and the at least one data source of the plurality of data sources;
determining, by the at least one processor, a second confidence factor for a remainder of the data types of the plurality of data types and a remainder of the data sources of the plurality of data sources;
comparing, by the at least one processor, the first confidence factor to the second confidence factor to determine a higher confidence factor;
responsive to determining the second confidence factor is higher than the first confidence factor, authenticating, by the at least one processor, the user;
responsive to determining the first confidence factor is higher than the second confidence factor:
identifying, by the at least one processor, a response action;
sending, by the at least one processor and to at least one computing device, the identified response action for execution, wherein sending the identified response action causes the at least one computing device to execute the response action; and
updating, by the at least one processor, the machine learning model based on the detecting the anomaly and the response action.

11. The method of claim 10, wherein the plurality of data sources includes computing devices associated with a user and Internet of Things (IoT) devices associated with the user.

12. The method of claim 10, wherein the plurality of data types includes at least one of: movement data, location data, typing patterns, typing speed, typing accuracy, or mouse speed.

13. The method of claim 10, wherein the response action includes at least one of: preventing access to a computing device, preventing access to an application, preventing access to a database, or preventing access to a physical space.

14. The method of claim 10, wherein the user data captured based on user interactions with each data source of the plurality of data sources is captured at various times of day and days of a week.

15. The method of claim 14, wherein the user specific baseline data is specific to at least one of: the time of day or day of the week.

16. The method of claim 10, wherein subsequent user data is received on a continuous basis.

17. One or more non-transitory computer-readable media storing instructions that, when executed by a computing platform comprising at least one processor, memory, and a communication interface, cause the computing platform to:
receive, from a plurality of data sources, user data captured based on user interactions with each data source of the plurality of data sources;
train, using the user data captured based on the user interactions with each data source of the plurality of data sources, a machine learning model;
generate, using the machine learning model, user specific baseline data;
receive, from the plurality of data sources, first user data, the first user data including a plurality of data types;
execute, using the first user data as inputs, the machine learning model to output whether an anomaly is detected in at least one data type of the plurality of data types and from at least one data source of the plurality of data sources, between the first user data and the user specific baseline data;
responsive to not detecting an anomaly in the at least one data type of the plurality of data types and from the at least one data source of the plurality of data sources, receive second user data and execute, using the second user data as inputs, the machine learning model to output whether an anomaly exists in the second user data;
responsive to detecting an anomaly in the at least one data type of the plurality of data types and from the at least one data source of the plurality of data sources:
determine a first confidence factor for the at least one data type of the plurality of data types and the at least one data source of the plurality of data sources;
determine a second confidence factor for a remainder of the data types of the plurality of data types and a remainder of the data sources of the plurality of data sources;
compare the first confidence factor to the second confidence factor to determine a higher confidence factor;
responsive to determining the second confidence factor is higher than the first confidence factor, authenticate the user;
responsive to determining the first confidence factor is higher than the second confidence factor:
identify a response action;
send, to at least one computing device, the identified response action for execution, wherein sending the identified response action causes the at least one computing device to execute the response action; and
update the machine learning model based on the detecting the anomaly and the response action.

18. The one or more non-transitory computer-readable media of claim 17, wherein the plurality of data sources includes computing devices associated with a user and Internet of Things (IoT) devices associated with the user.

19. The one or more non-transitory computer-readable media of claim 17, wherein the plurality of data types includes at least one of: movement data, location data, typing patterns, typing speed, typing accuracy, or mouse speed.

20. The one or more non-transitory computer-readable media of claim 17, wherein the response action includes at least one of: preventing access to a computing device, preventing access to an application, preventing access to a database, or preventing access to a physical space.

* * * * *